United States Patent [19]

Bock et al.

[11] 3,803,554

[45] Apr. 9, 1974

[54] APPARATUS FOR ADDRESSING AN ELECTRONIC DATA STORAGE

[75] Inventors: Dietrich W. Bock; Werner Haug, both of Boeblingen; Ulrich Olderdissen, Sindelfingen, all of Germany

[73] Assignee: International Business Machines Corporation, Armonk, N.Y.

[22] Filed: Apr. 27, 1972

[21] Appl. No.: 248,162

[30] Foreign Application Priority Data

Apr. 25, 1972 Germany ........................... 2121865

[52] U.S. Cl. ......................... 340/166 C, 340/173 R

[51] Int. Cl. .......................... H04q 9/00, G11c 7/00

[58] Field of Search ..... 340/173 R, 174 QA, 166 C, 340/166 R, 172.5

[56] References Cited

UNITED STATES PATENTS

| | | | |
|---|---|---|---|
| 3,737,860 | 6/1973 | Sporer | 340/172.5 |
| 3,292,151 | 12/1966 | Barnes et al. | 340/172.5 |
| 3,068,452 | 12/1962 | Sarrafian | 340/166 C X |
| 3,108,257 | 10/1963 | Buchholz | 340/166 C X |
| 3,599,182 | 10/1971 | Henle | 340/173 R |
| 3,691,538 | 9/1972 | Haney et al. | 340/166 R X |

*Primary Examiner*—Donald J. Yusko
*Attorney, Agent, or Firm*—Theodore E. Galanthay

[57] ABSTRACT

The disclosure describes a scheme for addressing an electronic data storage by dividing the storage into a predetermined number of blocks and powering only those blocks desired to be accessed. Block selection is accomplished by decoding several of the input signals into block selecting signals at the storage address register (SAR). This decoding may be accomplished by a particular connection of driver circuits in the storage address register (SAR) resulting in minimal added hardware and no additional time delay. The block selecting signals and the remaining input signals are ANDed, thereby accessing address lines only in selected blocks of the electronic data storage resulting in greatly reduced power requirements and heat dissipation.

3 Claims, 4 Drawing Figures

APPARATUS FOR ADDRESSING AN ELECTRONIC DATA STORAGE

BACKGROUND OF THE INVENTION

1. Field of the Invention

This invention relates to apparatus for addressing an electronic data storage and more particularly to an addressing circuit substantially reducing the current requirements for addressing an electronic data storage.

2. Description of the Prior Art

The fact which is already known from core storage technology, i.e. to amplify the signals used for addressing for storage elements arranged in a plurality of interconnected storage planes, in a driver arranged in series thereto, is equally employed in monolithic storage technology (Electronic Engineering, October 1967, Nguyen-huu and Murphy, "Solid-State h.l.t.t.l. 16-Bit Memory Element", p. 608, FIG. 8). In monolithic storages, the storage planes are incorporated by chips joined to form a storage module and containing a predetermined number of cells. The entire storage is then composed of a number of storage cards made of isolation material and carrying a predetermined number of storage modules. The organization of a storage card is selected in such a manner that the word or bit addresses, respectively, of a storage module are arranged in parallel by the associated address line and addressed via one respective driver. The addressing of the drivers is effected via an associated storage-address register.

In such a storage structure there is a considerable capacitive load at the address inputs, particularly in the present-day, highly integrated technology. This means that the address levels have to be amplfied accordingly. For that purpose, separate auxiliary component groups substantially containing corresponding amplifiers are at present arranged in series thereto which, however, has the consequence of at least strongly increased space requirements. In the course of the growing miniaturization of components so as to achieve maximum packing density, the space problem is becoming increasingly important in integrated storage technology. For that reason, solutions have been suggested how to achieve, without loss of functional safety, a reduction of the necessary address amplifiers or drivers, respectively.

An additional and quite essential problem occurs particularly in storage arrangements whose cells consist of monolithically integrated field effect transistors. Such storage cells require relatively high signal levels for addressing. Consequently, the storage arrangements cause high current changes in current supply when at predetermined times the storage is not selected, and when at other times the storage positions (words) are read in or out. In other words, the difference between the stand-by current and the selection current can reach extremely high values, particularly in connection with storages with field effect transistors.

The reason for this high difference is to be found in the first place in the already mentioned high address line capacities which as a whole have to be charged upon each selection process, i.e. upon each signal change, via the associated drivers. The charging of the address line capacities and the current differences resulting therefrom pose the problem that it is difficult and expensive to build current supply devices and distributing systems with the necessary small tolerances which can compensate these current differences. The abruptly occurring current changes can release attenuated oscillations exceeding the specified tolerances. Besides, there can be oscillations if the cycle time of the simultaneously switched storage addresses happens to coincide with the time constant of the current supply system including the current supply devices and distribution systems.

SUMMARY OF THE INVENTION

It is therefore an object of the present invention to provide a storage addressing where, without additional costs and space requirements, the difference between the stand-by current and the selection current, which is due to the charge of the address line capacities, is kept as low as possible. Particularly the decrease of the difference between the stand-by current and the selection current in a special embodiment is not to be achieved to the expense of an increase of the access time.

This problem is solved in that the storage is divided in a plurality of storage blocks and that by decoding addressed block selection signals are derived which as gate control signals merely cause the addressing of the address lines of the selected storage block.

In an advantageous manner, the addressing of each address line is effected via an associated driver whose input is designed as AND gate to which the respective address and the gate control signal are applied as input conditions.

In a special embodiment, the decoding is effected by ANDing addresses from the storage address register. A preferred embodiment consists in that for delay-free decoding true and inverted address outputs, each equipped with a decoupling stage, are provided, and that by directly connecting the outputs the logic combinations are realized to form the block selection signals.

BRIEF DESCRIPTION OF THE DRAWINGS

The foregoing and other objects, features and advantages of the invention will be apparent from the following more particular description of the present invention as illustrated in the accompanying drawings, wherein.

DESCRIPTION OF THE PREFERRED EMBODIMENT

For purposes of illustration, the present invention is described in the environment of a storage in which the storage cells and final address decoders are built on the same monolithic chip and fabricated in accordance with field effect transistor integrated circuit technology. One or more of these monolithic chips are attached on a common substrate forming a storage module. A plurality of these storage modules may be attached to a common circuit board forming a storage card. A plurality of these storage cards form the overall storage, together with the necessary logic and control circuits.

Further for purposes of illustrating the present example, assume that a chip includes 512 storage cells as well as associated decoders. Assume further that eight of these chips are placed on a single storage module permitting the storage of 4,096 bits of information. The storage module will then require an input of 12 address lines to access one of the 4,096 ($2^{12}$) storage locations. It is well known that n address lines are required to address one of $2^n$ storage locations. For addressing the storage cells of the present example, 12 address lines of a lower order are supplied by the storage address register (SAR), and chip selection is derived from addresses of higher order. The chip selection lines contain the card selection derived from further addresses of higher order. Externally, a storage module appears as a 4096X1 matrix, the data input and data output being performed by differential bit line pairs. Internally, however, the module may be arranged as a 64 bit matrix with 64 words, a 128 bit matrix with 32 words, or otherwise as desired.

Figure 1:
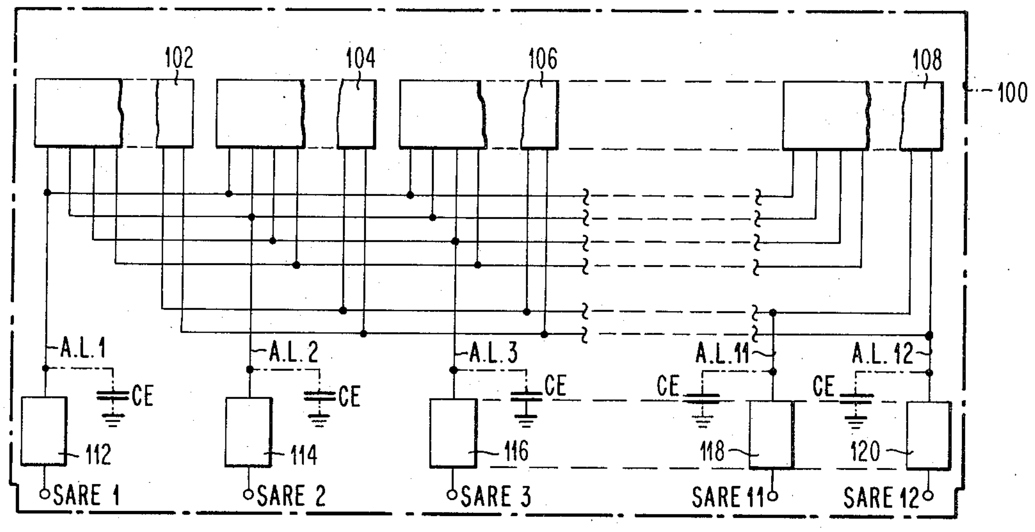
FIG. 1 is a schematc diagram of a storage card with eleven storage modules thereon each storage module including a plurality of individually addressable storage cells.

Refer now to FIG. 1 showing a storage card 100 with 11 storage modules 102, 104, 106, and 108 mounted thereon. These 11 storage modules have a common addressing but separate data inputs and outputs (not shown). It would commonly be referred to as a 4KX11 storage card. Addressing is affected via address lines which are common to all storage modules, that is, arranged in parallel for all storage cells. Each of the 12 address lines (labelled A.L.1, A.L.2, A.L.3, . . . A.L.11, and A.L.12) is connected to an associated driving circuit 112, 114, 116 . . . 118, and 120. The driving circuits are built with bipolar transistors and placed on a semiconductor chip in integrated technology. These driving circuits are amplifiers, and their function is to raise the signal amplitudes (1 volt approximately) supplied by the emitter-coupled bipolar logic circuits addressing them to the higher signal amplitudes (10 volts approximately) required for field effect transistors. Capacitances $C_E$ of the address lines, which have to be charged upon each signal changed by these driving circuits are also shown in FIG. 1. The storage card 100 depicted in FIG. 1 stores $11X2^{12}$ bits. Assume for the purpose of this example that 128 such storage cards 100 are included in the complete electronic data storage. Such an assumption would provide an overall capacity of $2^{18}$ words with 22 bits each.

Figure 2:
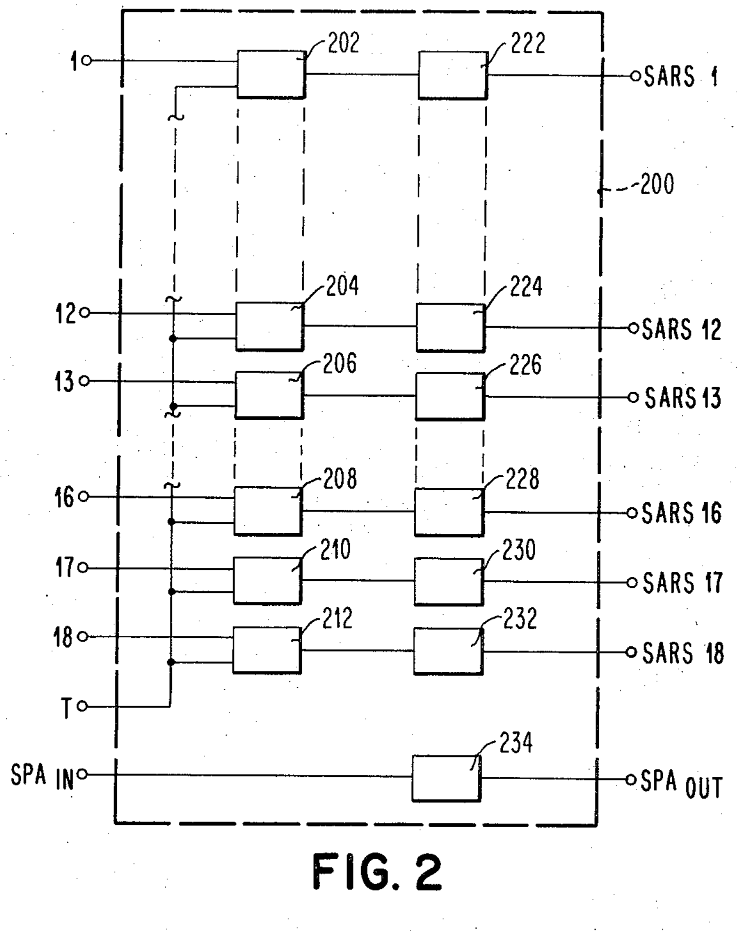
FIG. 2 is a schematic representation of a storage address register.

FIG. 2 represents a storage address register SAR 200 capable of addressing $2^{18}$ words. SAR 200 is the input means required for all known electronic data storage apparatus and has a plurality of input terminals numbered 1–18 for receiving an input signal pattern indicative of a particular address to be selected. A timing input is received at terminal T and a storage selection signal labelled SPA in is also provided. The input signals on input terminals 1–18 are connected to the inputs of flip-flops 202 to 212, the inputs of the flip-flops being also connected to the clock pulse source which is received at terminal T. The outputs of the flip flops are amplified by line drivers 222 to 232. Driver 234 amplifies the storage selection signal. The outputs SARS 1 to SARS 18 of SAR 200 were previously applied to the storage card 100 of FIG. 1. For addressing in accordance with the present invention it is preferable to assume $2^{14}$ words with 32 bits each. This is the same size overall storage as has been discussed throughout this example, (i.e. 22 x $2^{18}$), however, it permits the 128 storage cards 100 to be divided into four blocks of 32 storage cards each. Also, for $2^{14}$ words only 16 SARS lines are required.

Figure 3:
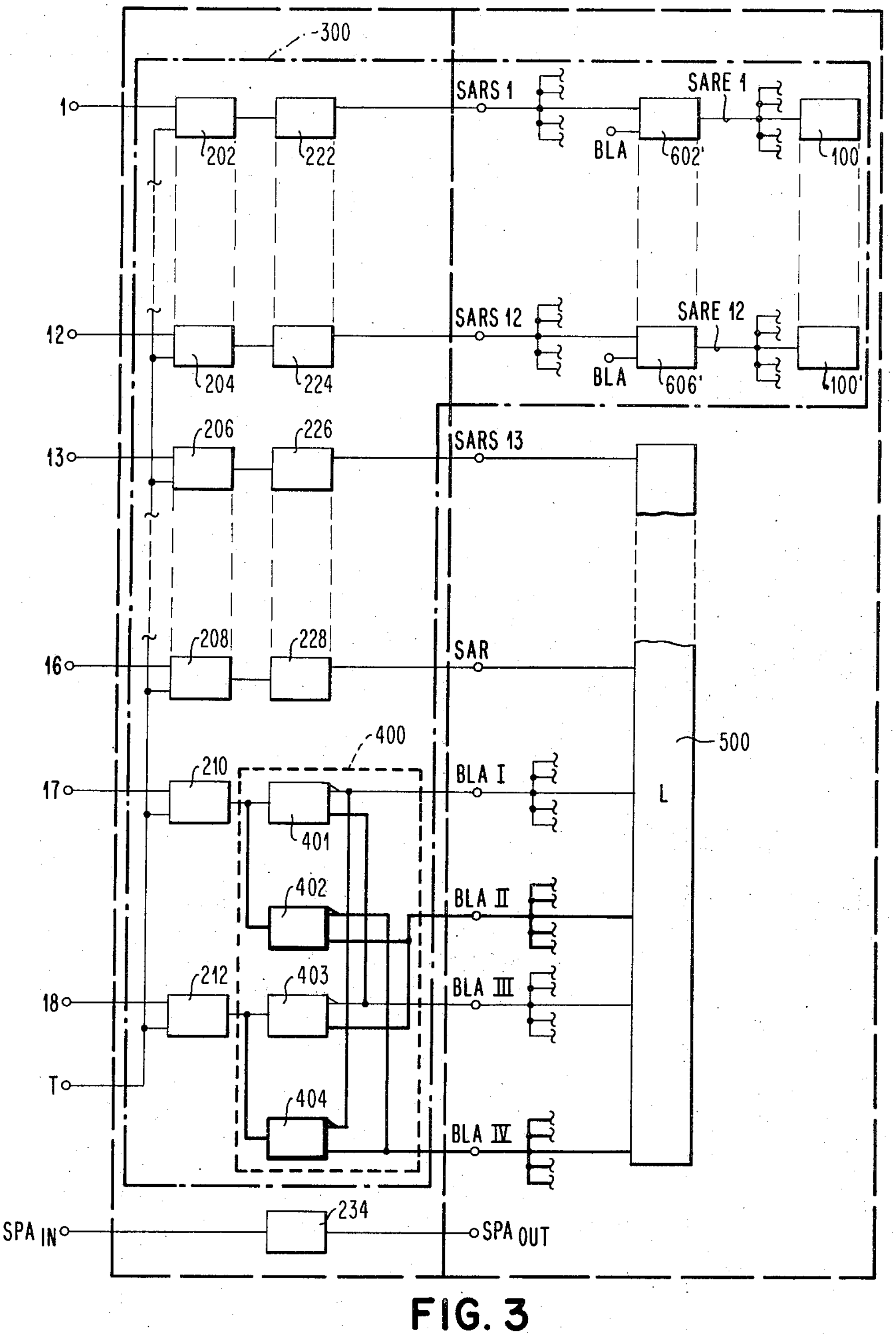
FIG. 3 is a storage address register modified in accordance with the block selection scheme of the present invention and the manner in which the modified storage address register is connected.

The improved arrangement in accordance with the present invention is specifically depicted in FIG. 3. FIG. 3 shows SAR 300 with block selecting means 400 and some additional circuits to be described in greater detail. Insofar as possible input terminals, output terminals, flip-flops, and drivers have been labelled as in FIG. 2. The signal on input terminals 1–12, 17, and 18 are required to access the storage. The signals on terminals 13–16 are provided to logic circuit 500, the details of which are not essential to an understanding of the present invention. The outputs SARS 1 to SARS 12 are supplied to one of coincidence circuit means such as 602' or 606' which in turn supply a signal to one of the 128 storage cards 100, 100' etc.

A very important aspect of the present invention is the block selecting means 400 which is responsive to the input signal on one or more of the input terminals (such as terminals 17 and 18) for providing a signal to select a particular section of the electronic data storage to be accessed. The block selecting means 400 consists of driver circuits 401–404 each having both true and complement outputs. The complement outputs are designated by the slash lines. This arrangement allows the electronic data storage to be divided into four blocks. Only one of output lines BLAI, BLAII, BLAIII, or BLAIV, can have an output signal depending on the input signal combination on terminals 17 and 18. To obtain an output signal on the BLAI line, the complement outputs on both drivers 401 and 404 must be at an up level i.e. they must both indicate the presence of a signal. In order for BLAII to be at an up level (indicating the presence of a signal) the true outputs of both drivers 402 and 403 must be at an up level. For a signal at output BLAIII the true output of driver 401 and the complement output of driver 403 must be at an up level. For an output at terminal BLAIV, in order to select the fourth block in the electronic data storage, the complement output of driver 402 and the true output of driver 404 must indicate the presence of a signal. This decoding scheme is vastly superior to merely ANDing the output of SAR 300 in that no additional time whatsoever is required. The drivers 230 and 232 of FIG. 2 have been replaced by drivers 401 to 404, the difference being that both true and complement outputs are provided. The outputs of drivers 401–404 can be directly connected so long as each driver is equipped with multiple outputs which are mutually neutralized and thus connectable. The neutralization can be effected in that each true and complement output contains a transistor which is switched in an emitter follower configuration. In this manner, the block selection signals occur simultaneously with address signals SARS 1 to SARS 12 at the inputs of the coincidence circuit means.

Figure 4:
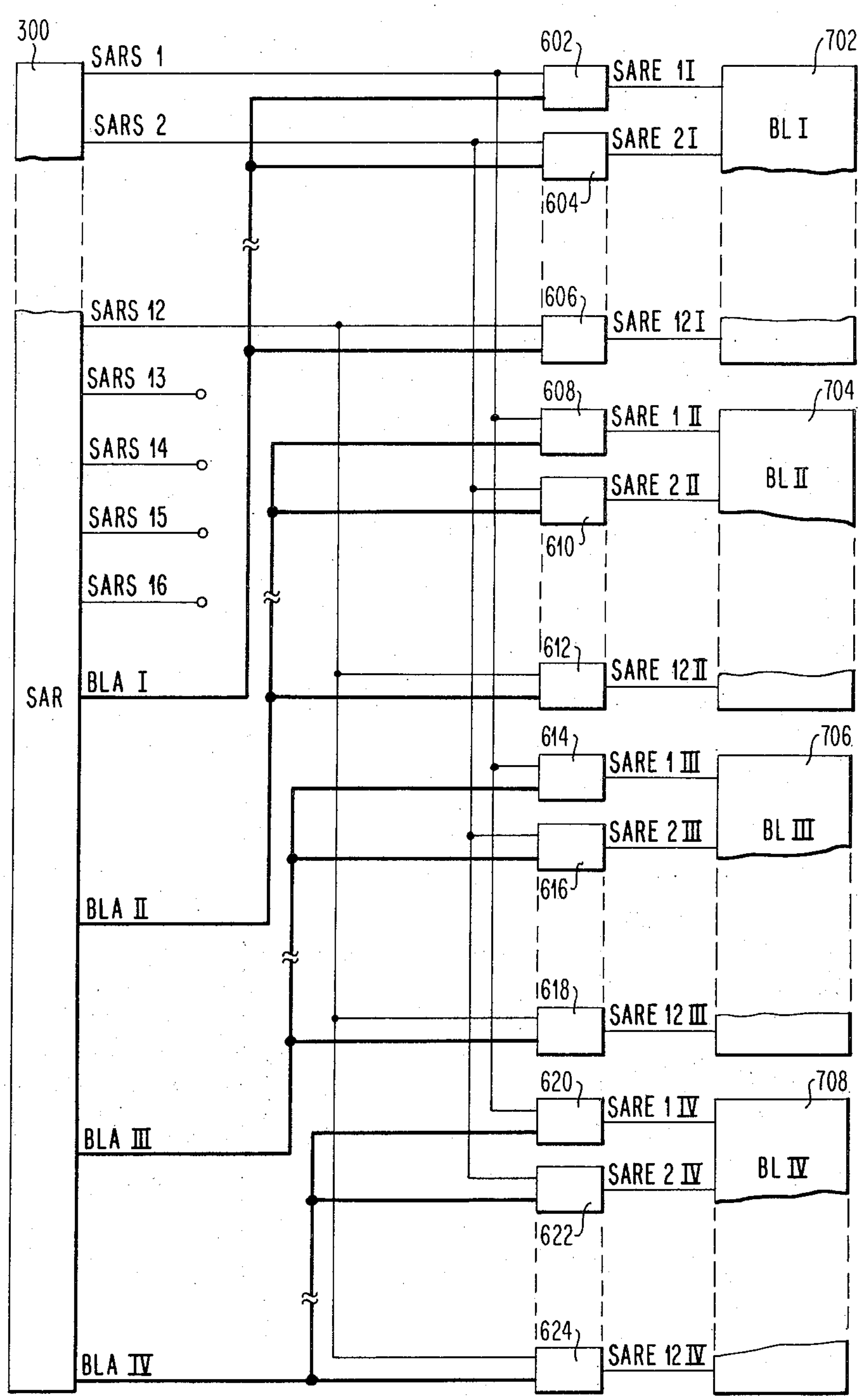
FIG. 4 is a schematic representation of the connection of the storage address register including the block selection means.

Refer now to FIG. 4 for a further description of the use of the combination of the block selection signals together with the other addressing signals. SAR 300 as well as all other circuitry previously described has been correspondingly numbered insofar as possible. Note that lines SARS 13–16 are not shown connected as they are normally applied to logic and timing circuits 500 (FIG. 3) which need not be described in greater detail for a full understanding of this invention. Lines SARS 1-12 are connected to each of 48 coincidence circuits 602 to 624. Lines BLAI to IV are each connected to a group of 12 of the plurality of coincidence circuits means. Thus line BLAI is connected to the 12 coincidence circuit means represented by 602 to 606; line BLAII is connected to the 12 coincidence circuit means represented by 608 to 612; line BLAIII is connected to coincidence circuit means represented by 614 to 618; and line BLAIV is represented by coincidence circuit means 620 to 624. Each of the plurality of coincidence circuit means has an AND circuit at its input and a driver at its output. Thus, each one of the plurality of coincidence circuit means provides an output signal only in response to a signal from both the input means (SAR 300) and the block selecting means 400. The outputs of the coincidence circuit means labelled SARE 1 I to SARE 12 IV are the lines which go to the various storage cards as for example card 100 in FIG. 1 as one of inputs SARE 1 to SARE 12. Thus, as shown in FIG. 4, block diagrams 702, 704, 706, and 708 further labelled BLI, BLII, BLIII and BLIV represent the four sections into which the entire electronic data storage has been divided for purposes of the present example. Since the total storage consists of 128 cards, each of sections 702 include 32 storage cards such as the storage card 100 illustrated in FIG. 1.

In operation, a particular word is addressed by the particular input signal pattern on input terminals 1–12, 17, and 18 as for example in FIG. 3. Block selecting means 400 converts the input on input terminals 17 and 18 to 4 discrete section selecting signals. A section selecting signal on line BLAI (see FIG. 4) conditions the coincidence circuit means leading to section 702 of the storage. A signal appearing also on line SARS 1, for example, will cause coincidence circuit 602 and only coincidence circuit 602 to provide a signal to the storage, particularly on line SARE 1. In this particular example, the SARE 1 line would be received at each of the 32 storage cards associated with block I at driving circuit 112 as shown in FIG. 1. The particular driving circuit means, such as 112, would cause address line A.L.1 to be brought to an up level in each of the 32 storage cards in section 702. The combination of up and down signals of the 12 address lines inputed to each storage module such as 102, 104, 106, and 108 is decoded within each said storage module 102, 104, 106, and 108 to select one particular chip out of the 1.1 $X2^{12}$ on the storage card. Thus, since each section consists of 32 storage cards, 32 address locations will be simultaneously selected by the presently described scheme. The "prescreening" of the address has avoided the powering of blocks 704, 706, and 708 without loss of time or the need for significant additional hardware as represented by block selecting means 400.

The following is a more detailed analysis of the tremendous savings in expended current in accordance with this invention.

Upon each addressing, i.e. upon each signal change at the output of driving circuits 112, 114, 116, 118, and 120 on the storage modules, address lines capacities $C_E$ (FIG. 1) have to be charged via the driving circuits, i.e. via their current supply source. If it is considered that all addresses SARE of all storage cards can be switched simultaneously, it is evident that enormous charging currents have to be supplied by the current supply source. This is now explained with figures: if the cycle time of storage selection signal SPA is called $T_Z$, the switching frequency of addresses SARE is $1/(2T_Z)$. If a linear rise of voltage V characterizing address SARE is assumed at the output of an individually switched driving circuit (e.g. 112) is assumed, the current supply source with voltage V must supply a selection current pulse $[i = C_E \cdot V/t]$ during rise time $t$. By means of integration, an average selection current $I = C_E \cdot V/2T_Z$ is obtained which is subject to the switching of a driving circuit.

The following numerical values can be assumed: $C_E$ = 400 pF (capacitive load at an address line of a storage card), $t$ = 40 ns, V = 10 V, and $T_Z$ = 500 ns. Thus, at the output of an interface driver of a storage card, during a switching process, a selection current pulse having a peak value of $i$ = 100 mA and, consequently, an average selection current I = 4 mA is obtained. Added to these values are the shares of approx. 10 mA with selection current pulse and approx. 5mA with average selection current, these shares being supplied via the storage modules, so that, for current supply source V, a selection current pulse of $i$ = 110 mA and an average selection current of I = 9 mA per card are obtained. If all twelve addresses SARE on all 128 storage cards switch simultaneously, the selection current pulse of the examined 262 K · 22 storage is $i$ = 168.96 A and the medium selection current I = 13.824A.

If the current to be supplied by the current supply source in the non-addressed state of the storage is called stand-by current $I_R$, two kinds of current changes between the addressed and the non-addressed state can be observed. One current change $\Delta i$ is obtained from the difference of selection current pulse $i$ and stand-by current $I_R$, whereas the other current change $\Delta I$ is obtained from the difference of average selection current I and stand-by current $I_R$.

With the given example and the assumable condition that stand-by current $I_R = 0$, the values $\Delta i$ = 168.96A and $\Delta I$ = 13.824 A are obtained as current change between addressed and non-addressed state.

This shows to what load differences the current supply system supplying the necessary operation currents for storage modules and driving circuits (e.g. 112) is being exposed. These enormous load differences therefore strongly influence the tolerances of the current supply system as the range to be controlled is very large. Besides, the current changes $\Delta I$ and $\Delta i$ can cause oscillations in the current supply system when the cycle time coincides with the time constant of the current supply system. These attenuated oscillations can by far exceed the permissible tolerances.

By the present invention, the following current changes are obtained. For principally avoiding extremely high selection current for big storages it is ensured that addresses SARS supply by the system change their voltage value only once in cycle time $T_Z$. This means that the cycle time of the 16 addresses SARS and of the four block selection signals is $2T_Z$. The division of the storage into four blocks thus prevents the switching of addresses SARS in at least two blocks. Assuming the least favorable conditions, we thus obtain a reduction of the selection current pulse $i$ thus amounts, in the present example, only 84.48 A at a maximum. Current change $\Delta I$ is reduced from 169A to 85A. It should be pointed out that with this reduction the energy consumption of the storage is decreased, too.

The reduction factor can easily be increased from 2 to e.g. 4, if the storage is divided into eight blocks with 16 storage cards each. The decoding and the distribution of the block selection signals has then to be increased accordingly.

In conclusion there has been described a scheme for addressing an electronic data storage in a greatly improved manner. While the invention has been particularly shown and described with reference to a preferred embodiment thereof, it will be understood by those skilled in the art that various changes in form and detail may be made therein without departing from the spirit and scope of the invention.

What is claimed is:

1. Apparatus for addressing an electronic data storage subdivided into a plurality of blocks of address locations, each said plurality of blocks including a plurality of discrete address locations comprising:

input means having a plurality of input terminals for receiving an input signal pattern indicative of a particular address to be selected;

block selecting means responsive to the input signal on one or more of said input terminals, for deriving a signal indicative of one of a plurality of blocks of said electronics data storage desired to be selected;

a plurality of coincidence circuit means, each providing an output signal only in response to a signal from both said input means and said block selecting means; and a plurality of driving circuit means, each responsive to the output of one of said coincidence circuit means, and each adapted for driving particularly selected address lines of said electronic data storage, those ones of said plurality of driving circuit means receiving a signal from one of said plurality of coincidence circuit means providing a driving signal to said particularly selected address lines, thereby powering only said particularly selected address lines; and a plurality of storage modules including decoding means responsive to the signals on said particularly selected address lines.

2. Apparatus as in claim 1 in which said block selecting means forms part of said input means.

3. Apparatus as in claim 1 in which said block selecting means provides a signal indicative of one of a plurality of sections of said electronic data storage without additional time delay.

* * * * *